(12) United States Patent
Chien

(10) Patent No.: US 11,677,754 B2
(45) Date of Patent: Jun. 13, 2023

(54) ACCESS CONTROL SYSTEMS AND METHODS

(71) Applicant: Daniel Chien, Bellevue, WA (US)

(72) Inventor: Daniel Chien, Bellevue, WA (US)

(*) Notice: Subject to any disclaimer, the term of this patent is extended or adjusted under 35 U.S.C. 154(b) by 179 days.

(21) Appl. No.: 16/708,423

(22) Filed: Dec. 9, 2019

(65) Prior Publication Data

US 2021/0176253 A1      Jun. 10, 2021

(51) Int. Cl.
*H04L 9/40*       (2022.01)
*H04L 12/417*     (2006.01)

(52) U.S. Cl.
CPC .......... *H04L 63/101* (2013.01); *H04L 12/417* (2013.01); *H04L 63/126* (2013.01)

(58) Field of Classification Search
CPC .... H04L 63/101; H04L 63/126; H04L 12/417
USPC ............................................................ 726/4
See application file for complete search history.

(56) References Cited

U.S. PATENT DOCUMENTS

| | | | |
|---|---|---|---|
| 6,016,553 A | 1/2000 | Schneider et al. | |
| 6,185,678 B1 | 2/2001 | Arbaugh et al. | |
| 6,289,462 B1 * | 9/2001 | McNabb | H04L 63/126 726/4 |
| 6,502,135 B1 | 12/2002 | Munger et al. | |
| 6,654,796 B1 | 11/2003 | Slater et al. | |
| 6,687,226 B1 | 2/2004 | Galyas | |
| 6,888,834 B1 | 5/2005 | Wood et al. | |
| 7,111,163 B1 | 9/2006 | Haney | |
| 7,143,175 B2 | 11/2006 | Adams et al. | |
| 7,346,770 B2 | 3/2008 | Swander et al. | |
| 7,363,656 B2 | 4/2008 | Weber et al. | |
| 7,401,358 B1 | 7/2008 | Christie et al. | |
| 7,457,823 B2 | 11/2008 | Shraim et al. | |
| 7,461,404 B2 | 12/2008 | Dudfield et al. | |
| 7,490,237 B1 | 2/2009 | Morais et al. | |

(Continued)

FOREIGN PATENT DOCUMENTS

| | | |
|---|---|---|
| JP | 2002-514326 | 5/2002 |
| JP | 2006001087 A * | 1/2006 |

(Continued)

OTHER PUBLICATIONS

Meng, Ge, and Jiao Yanli. "Research on E-Intelligence Maintenance System for Manufacturing Industrials." In 2011 International Conference on Internet Computing and Information Services, pp. 457-458. IEEE, 2011. (Year: 2011).*

(Continued)

*Primary Examiner* — Melvin H Pollack
(74) *Attorney, Agent, or Firm* — Benedict R. Dugan; Lowe Graham Jones PLLC

(57) ABSTRACT

Computer security techniques are described. One example provides a security module. The security module executes on a computing system and determines whether to allow a user or a program (e.g., native executable, script, etc.) associated with the user to access a resource, such as by reading, writing, or executing a file. This decision is based at least in part on whether an access control list that is associated with the resource specifies that a source (e.g., IP address, hardware address) that is associated with the user is allowed to access the resource. This decision can also or instead be based on whether the computing system is executing in maintenance mode, such as in single-user diagnostic mode.

19 Claims, 11 Drawing Sheets

(56) References Cited

U.S. PATENT DOCUMENTS

| | | | |
|---|---|---|---|
| 7,536,723 B1 | 5/2009 | Bhagwat et al. | |
| 7,540,028 B2 | 5/2009 | Ahmed et al. | |
| 7,602,731 B2 | 10/2009 | Jain | |
| 7,626,940 B2 | 12/2009 | Jain | |
| 7,725,936 B2 | 5/2010 | Banerjee et al. | |
| 7,797,436 B2 | 9/2010 | Banerjee et al. | |
| 7,826,602 B1 | 11/2010 | Hunyady et al. | |
| 7,832,009 B2 | 11/2010 | Wang et al. | |
| 7,979,889 B2 | 7/2011 | Gladstone et al. | |
| 8,161,552 B1 | 4/2012 | Sun et al. | |
| 8,423,631 B1 | 4/2013 | Mower et al. | |
| 8,495,700 B2 | 7/2013 | Shahbazi | |
| 8,621,604 B2 | 12/2013 | Chien | |
| 8,726,351 B2* | 5/2014 | Metzer | G06F 16/2308 713/168 |
| 8,788,839 B1 | 7/2014 | Dong et al. | |
| 8,813,186 B2 | 8/2014 | Hegg et al. | |
| 8,848,608 B1 | 9/2014 | Addepalli et al. | |
| 8,950,007 B1 | 2/2015 | Teal et al. | |
| 9,015,090 B2 | 4/2015 | Chien | |
| 9,172,721 B2 | 10/2015 | Jain | |
| 9,413,783 B1 | 8/2016 | Keogh | |
| 9,467,470 B2 | 10/2016 | Bhargava et al. | |
| 9,648,032 B2 | 5/2017 | Davydov et al. | |
| 9,654,458 B1 | 5/2017 | Bhaktwatsalam et al. | |
| 9,674,145 B2 | 6/2017 | Chien | |
| 9,740,870 B1* | 8/2017 | Shepard | G06F 21/60 |
| 9,825,911 B1 | 11/2017 | Brandwine | |
| 9,838,425 B2 | 12/2017 | Jalan et al. | |
| 9,892,284 B2 | 2/2018 | Wachendorf et al. | |
| 9,928,151 B1* | 3/2018 | Rodriguez Valadez | G06F 11/26 |
| 10,084,791 B2 | 9/2018 | Chien | |
| 10,171,463 B1 | 1/2019 | Wiger | |
| 10,375,071 B1* | 8/2019 | Hydell | H04L 63/20 |
| 10,382,436 B2 | 8/2019 | Chien | |
| 10,623,520 B1* | 4/2020 | Anderson, III | H04L 63/105 |
| 10,826,912 B2 | 11/2020 | Chien | |
| 10,848,489 B2 | 11/2020 | Chien | |
| 10,896,135 B1* | 1/2021 | Robinson | G06F 12/1027 |
| 11,095,706 B1* | 8/2021 | Ankam | H04L 67/025 |
| 11,372,654 B1* | 6/2022 | Battle | G06F 16/13 |
| 11,552,953 B1* | 1/2023 | Avadhanam | H04L 63/102 |
| 2002/0049883 A1 | 4/2002 | Schneider et al. | |
| 2002/0133721 A1 | 9/2002 | Adjaoute | |
| 2002/0188704 A1 | 12/2002 | Gold et al. | |
| 2003/0084349 A1 | 5/2003 | Friedrichs et al. | |
| 2003/0101357 A1 | 5/2003 | Ronen et al. | |
| 2003/0118038 A1 | 6/2003 | Jalava et al. | |
| 2003/0149668 A1 | 8/2003 | Lee et al. | |
| 2003/0149887 A1 | 8/2003 | Yadav | |
| 2003/0149888 A1 | 8/2003 | Yadav | |
| 2003/0185395 A1 | 10/2003 | Lee et al. | |
| 2003/0188190 A1 | 10/2003 | Aaron et al. | |
| 2003/0217289 A1 | 11/2003 | Ammon et al. | |
| 2004/0003285 A1 | 1/2004 | Whelan et al. | |
| 2004/0068562 A1 | 4/2004 | Tilton et al. | |
| 2004/0088537 A1 | 5/2004 | Swander et al. | |
| 2004/0123141 A1 | 6/2004 | Yadav | |
| 2004/0123157 A1 | 6/2004 | Alagna et al. | |
| 2004/0162992 A1 | 8/2004 | Sami et al. | |
| 2004/0186850 A1 | 9/2004 | Chowdhury et al. | |
| 2004/0187034 A1 | 9/2004 | Tamura et al. | |
| 2004/0255151 A1 | 12/2004 | Mei et al. | |
| 2005/0047355 A1 | 3/2005 | Wood et al. | |
| 2005/0060412 A1 | 3/2005 | Chebolu et al. | |
| 2005/0076222 A1 | 4/2005 | Olkin et al. | |
| 2005/0144279 A1 | 6/2005 | Wexelblat | |
| 2005/0144284 A1* | 6/2005 | Ludwig | H04N 7/147 348/E7.081 |
| 2005/0172229 A1 | 8/2005 | Reno et al. | |
| 2005/0226059 A1* | 10/2005 | Kavuri | G06F 3/0607 365/189.05 |
| 2005/0228899 A1 | 10/2005 | Wendkos et al. | |
| 2006/0021031 A1 | 1/2006 | Leahy et al. | |
| 2006/0031412 A1 | 2/2006 | Adams et al. | |
| 2006/0059092 A1 | 3/2006 | Burshan et al. | |
| 2006/0059136 A1 | 3/2006 | Wooldridge et al. | |
| 2006/0059238 A1 | 3/2006 | Slater et al. | |
| 2006/0059337 A1 | 3/2006 | Poyhonen et al. | |
| 2006/0069697 A1 | 3/2006 | Shraim et al. | |
| 2006/0069782 A1 | 3/2006 | Manning et al. | |
| 2006/0076404 A1* | 4/2006 | Frerking | G07F 17/32 235/382 |
| 2006/0080444 A1 | 4/2006 | Peddemors et al. | |
| 2006/0123464 A1 | 6/2006 | Goodman et al. | |
| 2006/0123478 A1 | 6/2006 | Rehfuss et al. | |
| 2006/0146816 A1 | 7/2006 | Jain | |
| 2006/0168022 A1 | 7/2006 | Levin et al. | |
| 2006/0190993 A1 | 8/2006 | Noble | |
| 2006/0203807 A1 | 9/2006 | Kouretas et al. | |
| 2006/0212931 A1 | 9/2006 | Shull et al. | |
| 2006/0224742 A1 | 10/2006 | Shahbazi | |
| 2006/0230039 A1 | 10/2006 | Shull et al. | |
| 2006/0230272 A1 | 10/2006 | Lawrence et al. | |
| 2006/0230452 A1 | 10/2006 | Field | |
| 2006/0253903 A1 | 11/2006 | Krumel | |
| 2007/0006305 A1 | 1/2007 | Florencio et al. | |
| 2007/0022479 A1 | 1/2007 | Sikdar et al. | |
| 2007/0050703 A1 | 3/2007 | Srivastava et al. | |
| 2007/0083670 A1 | 4/2007 | Kelley et al. | |
| 2007/0180448 A1* | 8/2007 | Low | G06F 3/1415 718/1 |
| 2007/0268837 A1 | 11/2007 | Melton et al. | |
| 2008/0071953 A1 | 3/2008 | Kershaw et al. | |
| 2008/0077995 A1 | 3/2008 | Cumyn | |
| 2008/0104186 A1 | 5/2008 | Wieneke et al. | |
| 2008/0147837 A1 | 6/2008 | Klein et al. | |
| 2008/0172382 A1 | 7/2008 | Prettejohn | |
| 2008/0256242 A1* | 10/2008 | Liebman | G11B 27/034 |
| 2008/0271118 A1 | 10/2008 | Greenlaw | |
| 2009/0043765 A1 | 2/2009 | Pugh | |
| 2009/0077616 A1 | 3/2009 | Lindholm et al. | |
| 2009/0185523 A1 | 7/2009 | Allen et al. | |
| 2009/0271625 A1 | 10/2009 | Kolluru et al. | |
| 2009/0287844 A1 | 11/2009 | Bailey | |
| 2009/0300759 A1 | 12/2009 | Wang et al. | |
| 2009/0311963 A1 | 12/2009 | Haverty | |
| 2010/0050255 A1 | 2/2010 | Upadhyay et al. | |
| 2010/0131756 A1 | 5/2010 | Schneider | |
| 2010/0132018 A1 | 5/2010 | Takala et al. | |
| 2010/0241836 A1 | 9/2010 | Proudler | |
| 2010/0325424 A1 | 12/2010 | Etchegoyen | |
| 2011/0113249 A1 | 5/2011 | Gelbard et al. | |
| 2012/0077480 A1 | 3/2012 | DeLuca | |
| 2012/0084549 A1 | 4/2012 | Mackintosh et al. | |
| 2012/0158541 A1 | 6/2012 | Ganti et al. | |
| 2013/0013905 A1 | 1/2013 | Held et al. | |
| 2013/0055256 A1 | 2/2013 | Banga et al. | |
| 2013/0198065 A1 | 8/2013 | McPherson et al. | |
| 2013/0252604 A1 | 9/2013 | Huber et al. | |
| 2013/0287208 A1 | 10/2013 | Chong et al. | |
| 2013/0301833 A1 | 11/2013 | Wong | |
| 2013/0318573 A1 | 11/2013 | Reunamaki et al. | |
| 2013/0333038 A1 | 12/2013 | Chien | |
| 2013/0346628 A1 | 12/2013 | Canion et al. | |
| 2013/0347111 A1 | 12/2013 | Karta et al. | |
| 2014/0006579 A1 | 1/2014 | Pitsch et al. | |
| 2014/0123276 A1* | 5/2014 | Bush | G06F 21/62 726/21 |
| 2014/0157355 A1 | 6/2014 | Clancy, III et al. | |
| 2014/0189808 A1 | 7/2014 | Mahaffey et al. | |
| 2014/0244991 A1 | 8/2014 | Akdemir et al. | |
| 2014/0258465 A1 | 9/2014 | Li | |
| 2014/0313975 A1 | 10/2014 | Berenberg et al. | |
| 2014/0325588 A1 | 10/2014 | Jalan et al. | |
| 2015/0020214 A1 | 1/2015 | Copsey | |
| 2015/0026784 A1 | 1/2015 | Kurkure | |
| 2015/0058628 A1 | 2/2015 | Abzarian et al. | |
| 2015/0067838 A1 | 3/2015 | Gunti et al. | |
| 2015/0082438 A1 | 3/2015 | Prieto Alvarez et al. | |
| 2015/0089621 A1 | 3/2015 | Khalid et al. | |
| 2015/0089625 A1 | 3/2015 | Swanson et al. | |

(56) References Cited

U.S. PATENT DOCUMENTS

| | | | |
|---|---|---|---|
| 2015/0143506 A1* | 5/2015 | Sugano | H04N 1/4413 726/17 |
| 2015/0180841 A1 | 6/2015 | Heffner | |
| 2015/0180875 A1 | 6/2015 | Kay | |
| 2015/0180884 A1 | 6/2015 | Bhargava et al. | |
| 2015/0188714 A1 | 7/2015 | Leoutsarakos et al. | |
| 2015/0213131 A1 | 7/2015 | Styler et al. | |
| 2015/0229609 A1 | 8/2015 | Chien | |
| 2015/0237049 A1 | 8/2015 | Grajek et al. | |
| 2015/0256546 A1 | 9/2015 | Zhu et al. | |
| 2015/0358338 A1 | 12/2015 | Zeitlin et al. | |
| 2015/0372978 A1 | 12/2015 | Bharrat et al. | |
| 2016/0021610 A1 | 1/2016 | Wan et al. | |
| 2016/0044035 A1* | 2/2016 | Huang | H04L 9/30 726/4 |
| 2016/0099963 A1 | 4/2016 | Mahaffey et al. | |
| 2016/0142393 A1 | 5/2016 | Wang et al. | |
| 2016/0179618 A1* | 6/2016 | Resch | H04L 67/1097 714/764 |
| 2016/0180094 A1* | 6/2016 | Dasar | G06F 9/4406 714/36 |
| 2016/0248795 A1 | 8/2016 | Chien | |
| 2016/0261601 A1 | 9/2016 | Zhou et al. | |
| 2017/0011219 A1 | 1/2017 | Li et al. | |
| 2017/0034193 A1 | 2/2017 | Schulman et al. | |
| 2017/0118210 A1 | 4/2017 | Athias | |
| 2017/0140165 A1* | 5/2017 | Kaplan | H04L 9/3213 |
| 2017/0185790 A1 | 6/2017 | Gauda | |
| 2017/0332307 A1 | 11/2017 | Pan | |
| 2017/0334522 A1 | 11/2017 | Zahid et al. | |
| 2017/0339156 A1* | 11/2017 | Gupta | H04L 63/0807 |
| 2017/0364685 A1 | 12/2017 | Shah et al. | |
| 2018/0020002 A1 | 1/2018 | Duca et al. | |
| 2018/0097843 A1 | 4/2018 | Bursell et al. | |
| 2018/0131719 A1 | 5/2018 | Amit et al. | |
| 2018/0145986 A1 | 5/2018 | Chien | |
| 2018/0165199 A1* | 6/2018 | Brandt | G06F 9/30043 |
| 2018/0189478 A1 | 7/2018 | Richardson et al. | |
| 2018/0191510 A1* | 7/2018 | Batten | H04W 12/04 |
| 2018/0302382 A1 | 10/2018 | Lehmann et al. | |
| 2019/0037406 A1 | 1/2019 | Wash | |
| 2019/0052606 A1 | 2/2019 | Lapidous | |
| 2019/0190723 A1 | 6/2019 | Lee et al. | |
| 2019/0205554 A1* | 7/2019 | Kleinpeter | G06F 16/125 |
| 2019/0312872 A1* | 10/2019 | Hydell | H04L 63/10 |
| 2020/0057664 A1* | 2/2020 | Durham | G06F 21/53 |
| 2020/0089914 A1* | 3/2020 | Komatsubara | G06F 21/51 |
| 2020/0110892 A1* | 4/2020 | Ramakrishnappa | H04L 67/564 |
| 2020/0120098 A1* | 4/2020 | Berg | H04L 63/104 |
| 2020/0136836 A1* | 4/2020 | Schiattarella | H04L 63/0823 |
| 2020/0213111 A1 | 7/2020 | Leavy et al. | |
| 2020/0295932 A1 | 9/2020 | Chien | |
| 2020/0310808 A1* | 10/2020 | Chen | G06F 9/30189 |
| 2020/0334362 A1* | 10/2020 | Staler | G06F 21/577 |
| 2020/0396222 A1* | 12/2020 | Gargaro | H04L 63/20 |
| 2020/0401325 A1* | 12/2020 | Lamba | G06F 3/0622 |
| 2020/0409734 A1* | 12/2020 | Sahita | G06F 9/5061 |
| 2021/0176253 A1* | 6/2021 | Chien | H04L 63/126 |

FOREIGN PATENT DOCUMENTS

| | | |
|---|---|---|
| JP | 2009-508189 | 2/2009 |
| JP | 2014-099793 | 5/2014 |
| JP | 2015-503789 | 2/2015 |
| JP | 2016-532381 | 10/2016 |
| JP | 2018-124893 | 8/2018 |
| WO | 2005/020446 | 3/2005 |
| WO | 2016/176686 | 11/2016 |
| WO | 2016/178816 | 11/2016 |
| WO | 2017/035159 | 3/2017 |
| WO | 2017/112641 | 6/2017 |
| WO | 2018/063583 | 4/2018 |
| WO | 2018/152618 | 8/2018 |

OTHER PUBLICATIONS

Extended European Search Report completed Jul. 11, 2016, in European Patent Application No. 14 83 6161, 7 pages.

Horowitz, Michael, "Examples of Links That Lie," michaelhorowitz.com, last updated Jan. 29, 2008, retrieved from the Internet at http://www.michaelhorowitz.com/linksthatlie.html, on Feb. 8, 2008, 11 pages.

International Search Report and Written Opinion of the International Searching Authority dated Aug. 29, 2019, in International Patent Annlication No. PCT/US19/23274, 7 pages.

International Search Report and Written Opinion of the International Searching Authority dated Oct. 18, 2018, in International Patent Application No. PCT/US18/29486, 8 pages.

International Search Report and Written Opinion of the International Searching Authority dated Aug. 21, 2014, in International Patent Application No. PCT/US14/31244, 6 pages.

International Search Report and Written Opinion of the International Searching Authority dated Jul. 25, 2019, in International Patent Application No. PCT/US19/34039, 7 pages.

International Search Report and Written Opinion of the International Searching Authority dated Oct. 12, 2007, in International Patent Application No. PCT/US06/35159, 6 pages.

International Search Report and Written Opinion of the International Searching Authority dated Jan. 31, 2018, in International Patent Application No. PCT/US17/60889, 6 pages.

International Search Report and Written Opinion of the International Searching Authority dated Feb. 21, 2018, in International Patent Application No. PCT/US17/61886, 6 pages.

International Search Report and Written Opinion of the International Searching Authority dated Apr. 23, 2008, in International Patent Application No. PCT/US07/64102, 8 pages.

"Netcraft Toolbar Tutorial," Netcraft Ltd, 2007, retrieved from the Internet at http://news.netcraft.com/archives/2004/12/29/netcraft_toolbar_tutorial.html, on Feb. 8, 2008, 4 pages.

Office Action dated Mar. 20, 2009, in U.S. Appl. No. 11/470,581, 7 pages.

International Search Report and Written Opinion of the International Searching Authority completed Aug. 24, 2020, in International Patent Application No. PCT/US19/67003, 9 pages.

International Search Report and Written Opinion of the International Searching Authority in International Patent Application No. PCT/US22/25174 filed Apr. 18, 2022, 7 pages.

Extended European Search Report dated Jul. 15, 2022, in European Patent Application No. 19897426.3, 10 pages.

Extended European Search Report dated May 10, 2022, in European Patent Application No. 19867056.4, 7 pages.

\* cited by examiner

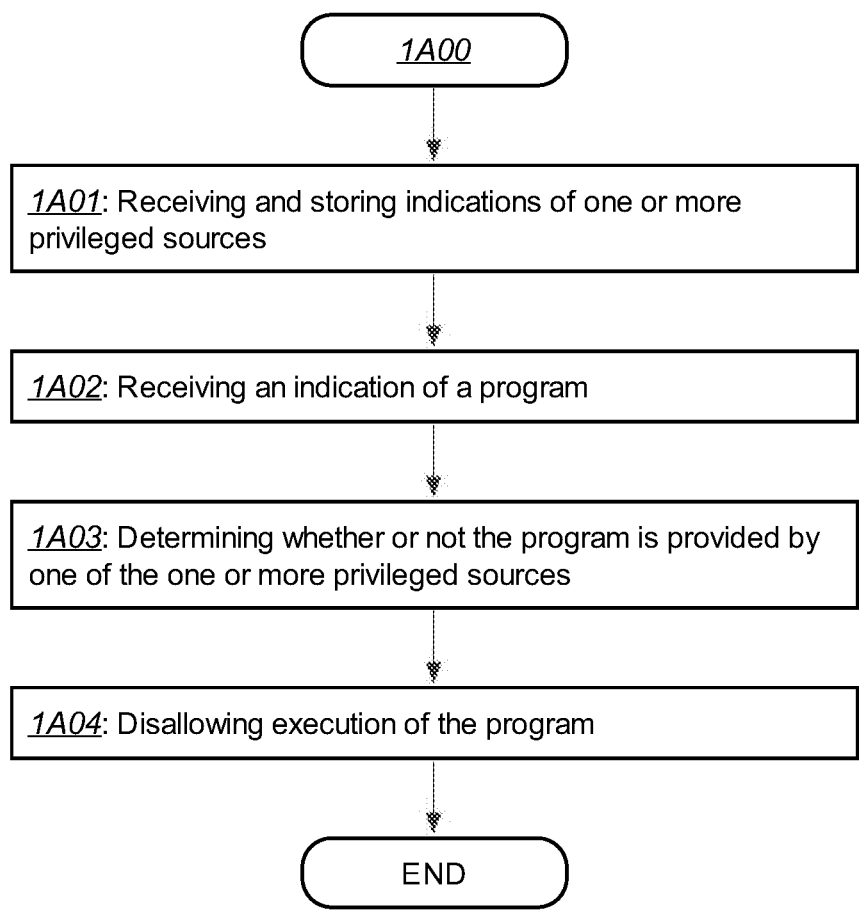

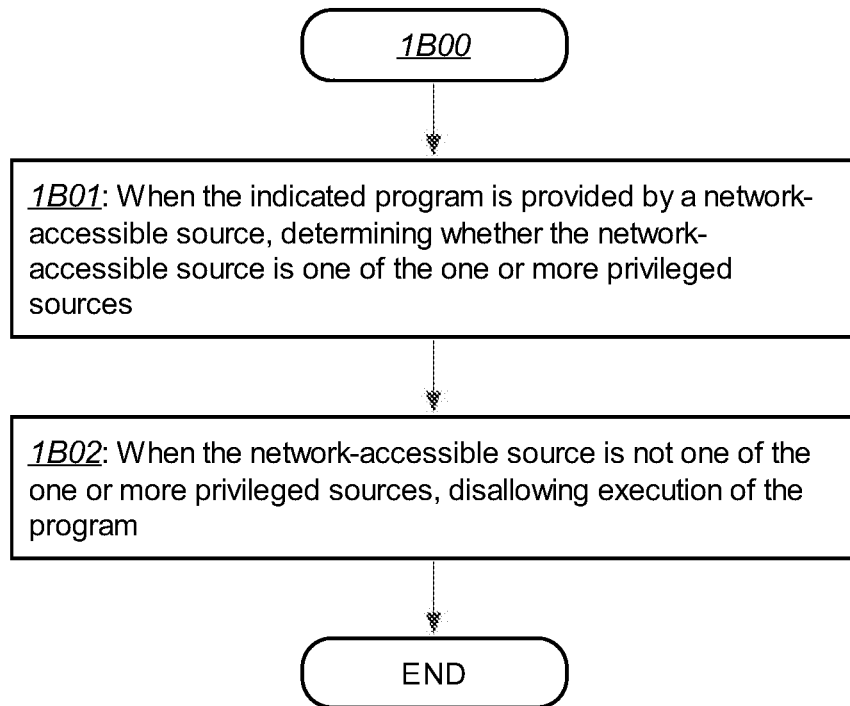
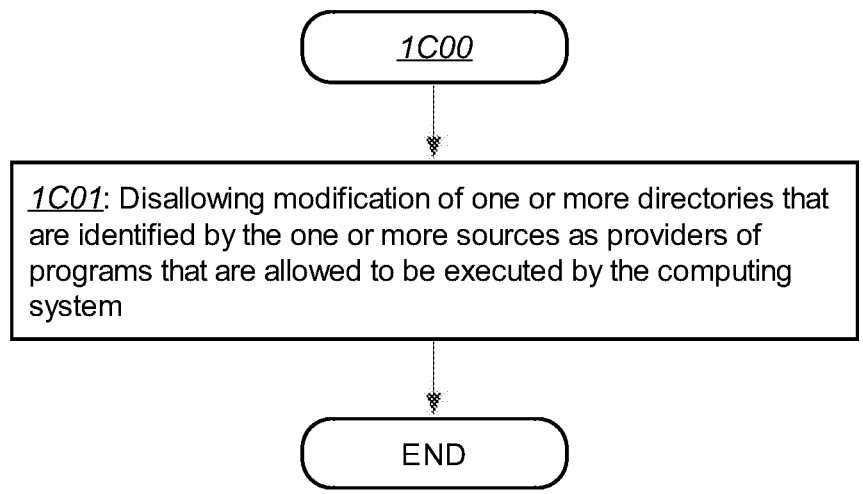

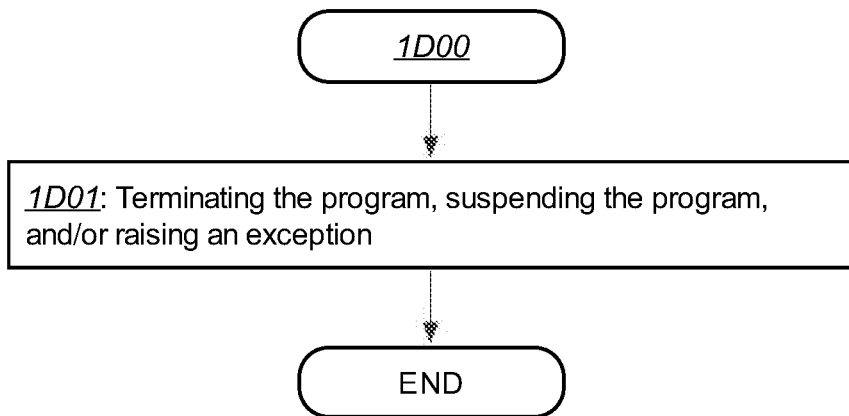
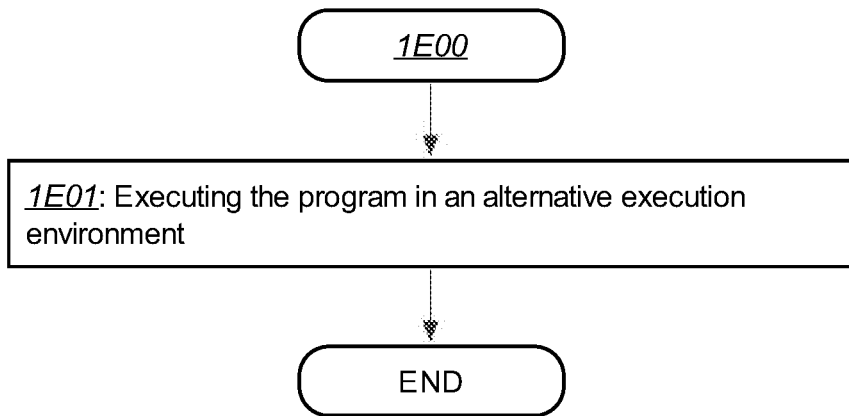

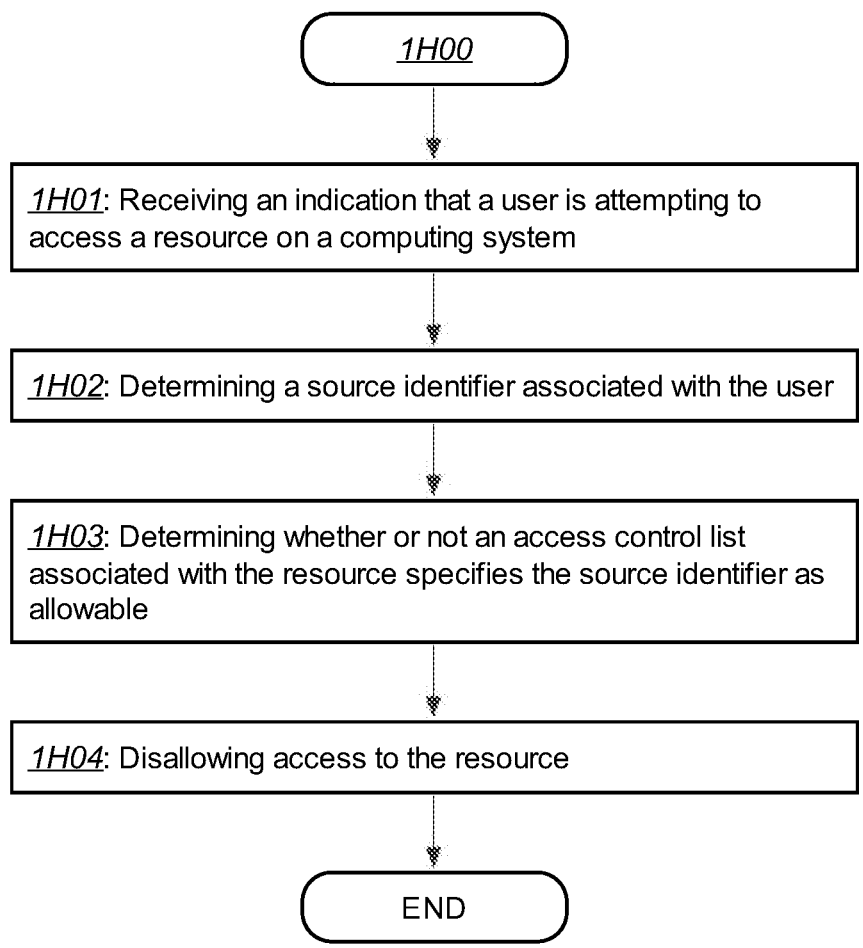

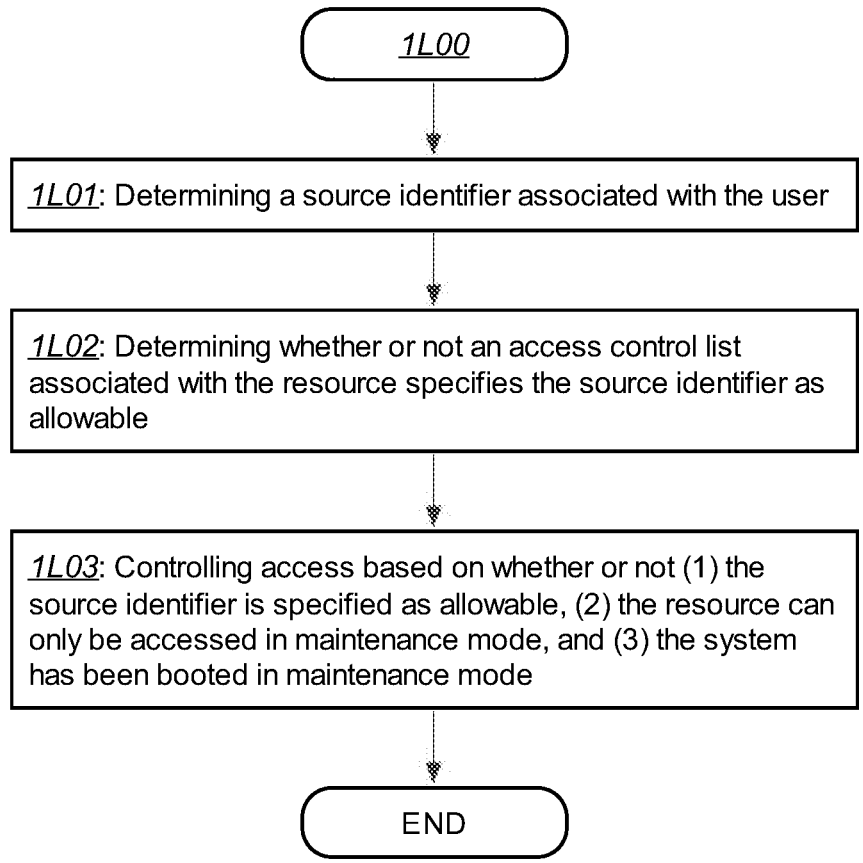

ACCESS CONTROL SYSTEMS AND METHODS

TECHNICAL FIELD

The present disclosure relates to methods, techniques, and systems for computer security, and more particularly suppressing, controlling, or restricting execution of malicious software.

BACKGROUND

Hackers and other malicious parties are increasingly attempting to penetrate computing systems operated by home users, corporations, or governments. In many cases, hackers attempt to install and run malicious software on a target computing system. The malicious software (e.g., viruses, Trojan horses, worms, etc.) can be used by the hacker to damage, control, gain access, or otherwise compromise the computing system.

BRIEF DESCRIPTION OF THE DRAWINGS

FIGS. 1A-1L are flow diagrams that illustrate processes performed by example embodiments.

DETAILED DESCRIPTION

Figure 1F:
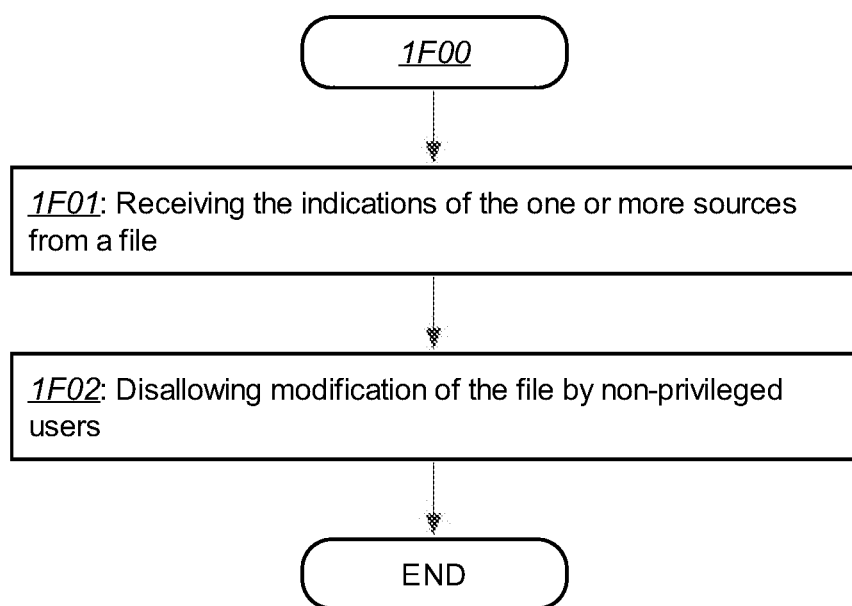

Embodiments described herein provide enhanced computer- and network-based methods, devices, and systems for computer security, and more particularly suppressing, controlling, or restricting execution of malicious software. Some embodiments provide a computer security module ("CSM") that is configured to control (e.g., suppress, restrict, monitor) the execution of malicious software on a computing system.

The core function of the CSM is to determine whether or not to allow a program (e.g., native executable, script, etc.) to execute. This decision is based at least in part on the source of the program, specifically whether the program is provided by one of a set of privileged (or "safe") source. A privileged program source may be any module, mechanism, or process that can provide executable instructions, such as directory or folder (e.g., on a local disk or network-accessible store), a computing device (e.g., server computer), another program (e.g., a Web server), or the like.

In some cases, a privileged source is a privileged folder or directory. A privileged folder is a folder that has been identified as storing programs that are eligible to be executed on the computer system. The privileged set of folders may contain one or more of: operating system folders (e.g., /bin, /sbin, /system32, etc.); application folders (e.g., /Program Files, /usr/bin); startup or services folders; third-party app folders; folders for the organization (e.g., corporation) that owns or administers the computer to install their own authorized programs; or the like.

In some cases, a privileged source is a privileged computer or process. A privileged computer can be identified by one or more identifiers, such as a machine name, IP address, domain name, process name, process identifier, process/program signature (e.g., a hash of the program instructions), or the like.

Privileged sources can be managed by way of a "white list" or similar data structure. The white list includes multiple identifiers of privileged sources. The identifiers may be or include directory names (system 32), directory paths (e.g., /usr/bin), IP addresses, domain names, machine names, or the like. In some cases, URLs may be used to identify privileged sources. A privileged source may be identified or determined based on other or additional properties. For example, some embodiments may consider a source privileged if communication with that source is occurring at a specified time of day (e.g., within a time range), if the source is located in a specified geographic region, if the source address is associated with a particular organization (e.g., via a WHOIS lookup), or the like. Some embodiments may generally base the determination of whether a source is privileged on whether there are one or more allowed or allowable properties of the communication with the source. Additional information regarding determining the allowability of network communication can be found in U.S. Pat. No. 10,084,791, entitled "Evaluating a Questionable Network Communication," issued Sep. 25, 2018, the content of which is incorporated herein by reference.

The CSM may be implemented in various ways. The CSM may be implemented as code that exists in one or more locations within the operating system, including the loader, scheduler, memory manager, or the like. For example, the loader may check the location of every program as it is loaded into memory. If the location is not in the set of privileged folders, the loader terminates the execution. As another example, the scheduler may check, before switching to a next program on the ready queue, whether the program was loaded from one of the privileged folders. If not, the scheduler terminates the program. Similarly, the memory manager can check, when asked to create a new virtual address space (e.g., page tables, etc.), whether the requesting program was loaded from one of the privileged folders.

Script interpreters may also be employed to control the execution of potentially malicious programs. In some embodiments, script interpreters (e.g., for shell scripts, VBScript, Perl, Python, etc.) will refuse to execute/interpret a given script if it is not being loaded from one of the privileged folders.

The described techniques of course require that the privileged folders be "locked down." In other words, the privileged folders are write protected for ordinary users, so that only users having the proper administrative privileges can install programs in those folders. In addition, other measures may be taken to restrict the ability of malicious parties from installing programs, such as secure boot, locked BIOS, and the like.

Some embodiments use modified access control lists to restrict access to resources (e.g., folders, files, libraries, executables) on the computing system. Prior art access control lists (ACLs) identify one or more users or groups that have permissions to read, write, or execute a resource. Prior art access control lists have no ability to restrict the source or manner of access by the user. Some embodiments solve this problem by including an access source field in the ACL. The access source field identifies a computer that is allowed to access the resource associated with the ACL. The access source field may include one or more of an IP address, an IP address range, a hardware identifier (e.g., a MAC address), or the like.

The process for using a modified ACL is as follows. When a user (or program) attempts to access a resource, the CSM checks the ACL for the resource. If the ACL includes an access source field, the CSM determines the access source for the user. If the user is accessing via a remote machine, the CSM determines the source IP address for that machine.

The CSM then checks the source IP address against the allowable IP addresses in the ACL. If the source IP address is allowed, then the CSM allows the access to the resource. If not, the CSM restricts access. Other variations are contemplated. For example, the ACL may specify that only accesses from the physical terminal are allowed, and no remote network accesses are allowed. Or the ACL may specify that any accesses from the machine's subnet are allowed.

Some embodiments add a new privilege level to the operating system. This privilege level is above root or superuser access and requires that the access occur only when the system is booted in safe or maintenance mode by a privileged user, such as the root, administrator, or superuser. Maintenance mode is in some systems a diagnostic or administrative mode in which only core operating system services are started in order to diagnose and fix problems, or modify the operating system components, configuration, or functionality. In typical systems, only specific privileged users are allowed to log in during maintenance mode. Such users may also be restricted to only logging in from the local console (no network login). Maintenance mode is in some systems also a single-user mode, such that only the local administrative user (e.g., root) can log in. In some operating systems, maintenance mode can only be entered by pressing a keyboard key or other console input during startup. In other cases, the mode can only be entered by booting from a particular physical media device (e.g., USB stick or CD-ROM).

In some embodiments, a new field (a "safe bit") is added to the ACL for each resource that specifies that the resource can only be modified when the machine is executing in safe or maintenance mode. This technique stops any hacker from accessing, modifying, or executing folders or other resources even if the hacker has managed to gain root access. Unless the hacker can physically access and boot the computing system into safe mode, the hacker will not be able to access resources protected by the safe bit.

FIGS. 1A-1L are flow diagrams of example security processes performed by example embodiments. The process may be implemented as computer instructions executing on a computing system. As noted above, these instructions may reside in one or more portions of the operating system, including the loader, scheduler, memory manager, and the like. The instructions may also or instead be present in programs that execute "outside" of the operating system, such as shell command interpreters, scripting language interpreters, virtual machines (e.g., Java Virtual Machine, C # VM), or the like.

FIG. 1A is a flow diagram of example logic for computer security. The illustrated logic in this and the following flow diagrams may be performed by, for example, the module 100 described with respect to FIG. 2, below. FIG. 1A illustrates a process 1A00 that includes the following block(s).

Block 1A01 includes receiving and storing indications of one or more privileged sources that are each designated as providing programs that are allowed to be executed on a computing system. A source may be a directory or folder on a local or remote file system. A source may also or instead be a computer (e.g., a server) that is identified by an IP address, domain name, machine name, URL, or the like. In some embodiments, the process will read or access a "white list" of "safe" sources from a write protected document stored in the file system. In the white list, each source is designated as being a source of programs that are eligible for execution.

Block 1A02 includes receiving an indication of a program. The indication of the program may be received before or during the initiating of the program, such as prior to or during the loading process. The indication of the program will include or can be used to determine the location of the program, specifically the identity of the directory from which the program is being loaded. In the case of programs obtained from remote sources (e.g., JavaScript code received by a Web browser), the indication may be or include a URL, IP address, domain name, or other identifier of the remote source.

Block 1A03 includes determining whether or not the program is provided by one of the one or more privileged sources. The program is looked up in the white list of privileged sources. This may be accomplished via a dictionary lookup, hash table, or the like. This operation can include looking up the program name, remote program source (e.g., domain name, IP address), or the like.

Block 1A04 includes disallowing execution of the program, when the program is not provided by any of the privileged sources. Disallowing execution of the program may accomplished in various ways, such as by terminating the loading process, raising an exception (so that the program will be terminated by the operating system), refusing to create a virtual memory space, the scheduler refusing to run or switch to the process, or the like.

FIG. 1B is a flow diagram of example logic illustrating an extension of process 1A00 of FIG. 1A. FIG. 1B illustrates a process 1B00 that includes the process 1A00, and which further includes the following block(s).

Block 1B01 includes when the indicated program is provided by a network-accessible source, determining whether the network-accessible source is one of the one or more privileged sources. In typical embodiments, a Web browser or other module that fetches the program from a remote source will check whether the remote source is identified in the white list. This can include checking if the IP address, domain name, machine name, or other identifier of the remote source is present in the white list.

Block 1602 includes when the network-accessible source is not one of the one or more privileged sources, disallowing execution of the program. For example, if the source identifier is not present in the white list, then the Web browser or similar module will refuse to load or execute the program. Note that this approach may require the use of a Web browser that has been modified to perform these checks. Users are not able to execute arbitrary remote code because they cannot manually download and execute such code (because only code in designated directories can run), and because they are also not allowed to install an insecure Web browser in any of the designated privileged directories.

FIG. 1C is a flow diagram of example logic illustrating an extension of process 1A00 of FIG. 1A. FIG. 1C illustrates a process 1C00 that includes the process 1A00, and which further includes the following block(s).

Block 1C01 includes disallowing modification of one or more directories that are identified by the one or more sources as providers of programs that are allowed to be executed by the computing system. For safe sources that are directories, operating systems permissions can be employed to restrict modification of such directories (e.g., by adding or removing programs) by non-privileged users.

FIG. 1D is a flow diagram of example logic illustrating an extension of process 1A00 of FIG. 1A. FIG. 1D illustrates a process 1D00 that includes the process 1A00, wherein the disallowing execution of the program includes the following block(s).

Block 1D01 includes terminating the program, suspending the program, and/or raising an exception.

FIG. 1E is a flow diagram of example logic illustrating an extension of process 1A00 of FIG. 1A. FIG. 1E illustrates a process 1E00 that includes the process 1A00, wherein the disallowing execution of the program includes the following block(s).

Block 1E01 includes executing the program in an alternative execution environment. In some embodiments, the program may instead be allowed to execute, but will be placed within an alternative execution environment, such as a sandbox or isolated virtual machine. In such embodiments, the program can be monitored to better understand the behavior and properties of potentially malicious code.

FIG. 1F is a flow diagram of example logic illustrating an extension of process 1A00 of FIG. 1A. FIG. 1F illustrates a process 1F00 that includes the process 1A00, and which further includes the following block(s).

Block 1F01 includes receiving the indications of the one or more sources from a file. Some embodiments store the list of privileged sources in a file that is write protected from non-administrative users.

Block 1F02 includes disallowing modification of the file by non-privileged users. Only administrative users may modify the file that identifies the privileged execution sources.

Figure 1G:
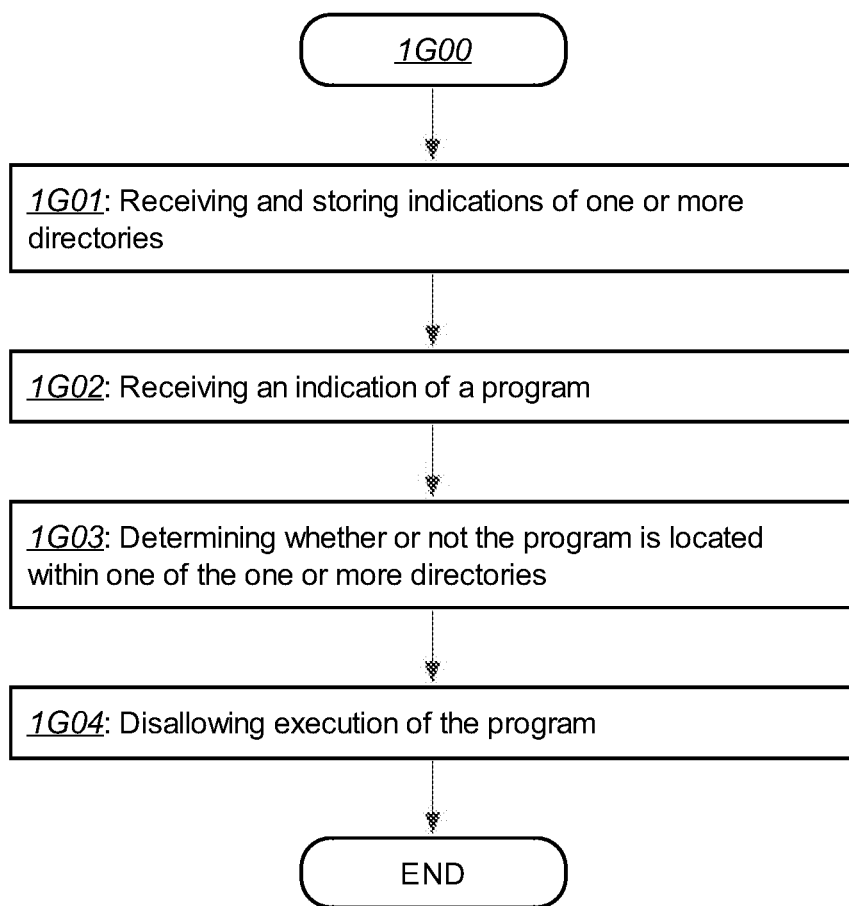

FIG. 1G is a flow diagram of example logic for computer security. FIG. 1G illustrates a process 1G00 that includes the following block(s).

Block 1G01 includes receiving and storing indications of one or more directories that are each designated as containing programs that are allowed to be executed on a computing system. In some embodiments, the process will read a list of files from a write protected document stored in the file system.

Block 1G02 includes receiving an indication of a program. The indication of the program may be received before or during the initiating of the program, such as prior to or during the loading process. The indication of the program will include or can be used to determine the location of the program, specifically the identity of the directory from which the program is being loaded.

Block 1G03 includes determining whether or not the program is located within one of the one or more directories. The location of the program is looked up in the list of privileged folders. This may be accomplished via a dictionary lookup, hash table, or the like.

Block 1G04 includes disallowing execution of the program, when the program is not located within any of the one or more directories. Disallowing execution of the program may accomplished in various ways, such as by terminating the loading process, raising an exception (so that the program will be terminated by the operating system), refusing to create a virtual memory space, the scheduler refusing to run or switch to the process, or the like.

FIG. 1H is a flow diagram of example logic for computer security. FIG. 1H illustrates a process 1H00 that includes the following block(s).

Block 1H01 includes receiving an indication that a user is attempting to access a resource on a computing system. For example, the process may receive an indication that a user (or a program associated with the user) is attempting to read, write, or execute a file, directory, or program on the computing system.

Block 1H02 includes determining a source identifier associated with the user. For example, the process may receive an IP address that is associated with a remote access of the resource. Alternatively, the source identifier may be a hardware identifier such as a MAC address. In some cases, the the process may receive a token (e.g., random number) that was generated during an authentication process between the user and the system (or some other authenticating computer system). During authentication, this token may have been associated (e.g., in a table) with the source identifier. For example, a table may be used to associate authentication tokens with IP addresses or hardware addresses. This token may then be used to look up the source identifier.

Block 1H03 includes determining whether or not an access control list associated with the resource specifies the source identifier as allowable. In some embodiments, every resource has an access control list that additionally specifies one or more identifiers of local or remote sources that are allowed to access the resource. The identifiers may by network addresses or ranges, hardware identifiers, or the like.

Block 1H04 includes disallowing access to the resource when the source identifier is specified as not allowable. Disallowing access may include disallowing execution of the resource, as described above. Disallowing access may also or instead include refusing to open, read, or write the resource.

Figure 1I:
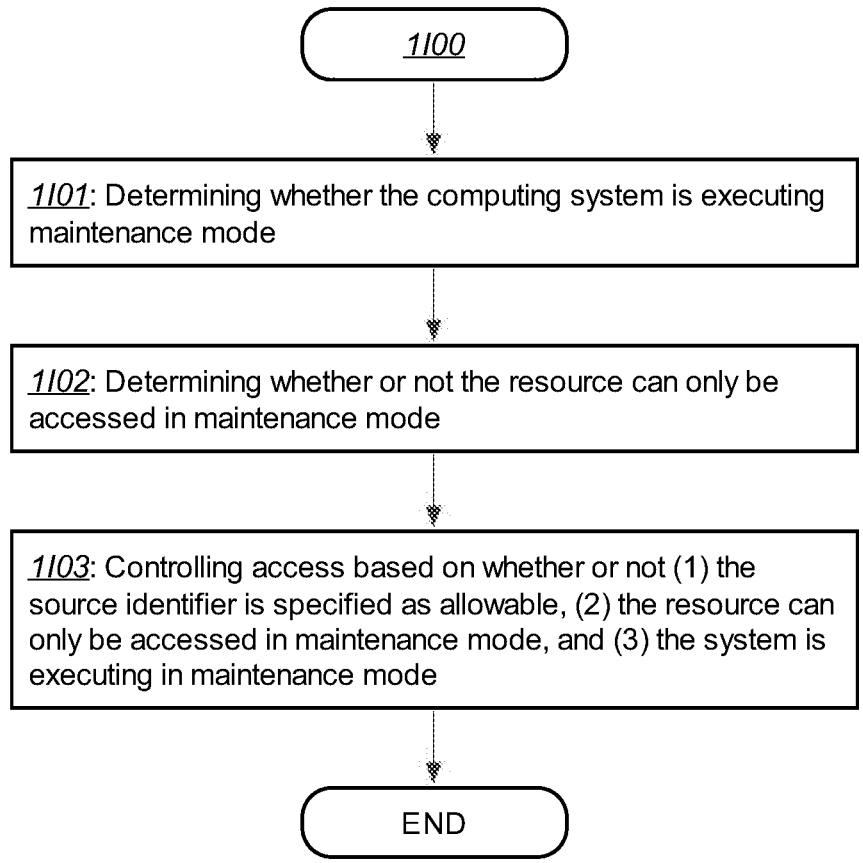

FIG. 1I is a flow diagram of example logic illustrating an extension of process 1H00 of FIG. 1H. FIG. 1I illustrates a process 1I00 that includes the process 1H00, and which further includes the following block(s).

Block 1I01 includes determining whether the computing system is executing maintenance mode. For example, the process may determine whether the computer has been booted into safe or maintenance mode, such as by reading a flag or file or other identifier that was set during system boot.

Block 1I02 includes determining whether or not the resource can only be accessed in maintenance mode. In some embodiments, every resource has an associated permission bit that indicates whether or not the resource is accessible only in safe mode. This bit can be combined with other permission identifiers, such as user or group identifiers to restrict access to particular users.

Block 1I03 includes controlling access based on whether or not (1) the source identifier is specified as allowable, (2) the resource can only be accessed in maintenance mode, and (3) the system is executing in maintenance mode. Controlling access includes allowing or disallowing access to the resource. In some embodiments, some resources are locked down in the sense that they can only be accessed in maintenance mode and when the source identifier is specified as an allowable source.

Figure 1J:
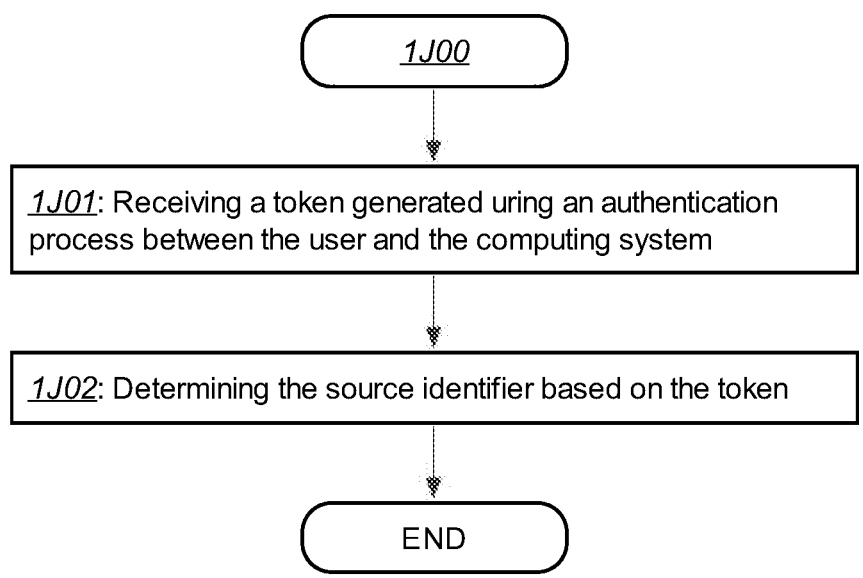

FIG. 1J is a flow diagram of example logic illustrating an extension of process 1H00 of FIG. 1H. FIG. 1J illustrates a process 1J00 that includes the process 1H00, wherein the determining a source identifier associated with the user includes the following block(s).

Block 1J01 includes receiving a token generated during an authentication process between the user and the computing system. The token may be, for example, a random number.

Block 1J02 includes determining the source identifier based on the token. The process can look up the source identifier in a table that maps authentication tokens to IP addresses, hardware identifiers, user identifiers, or the like.

Figure 1K:
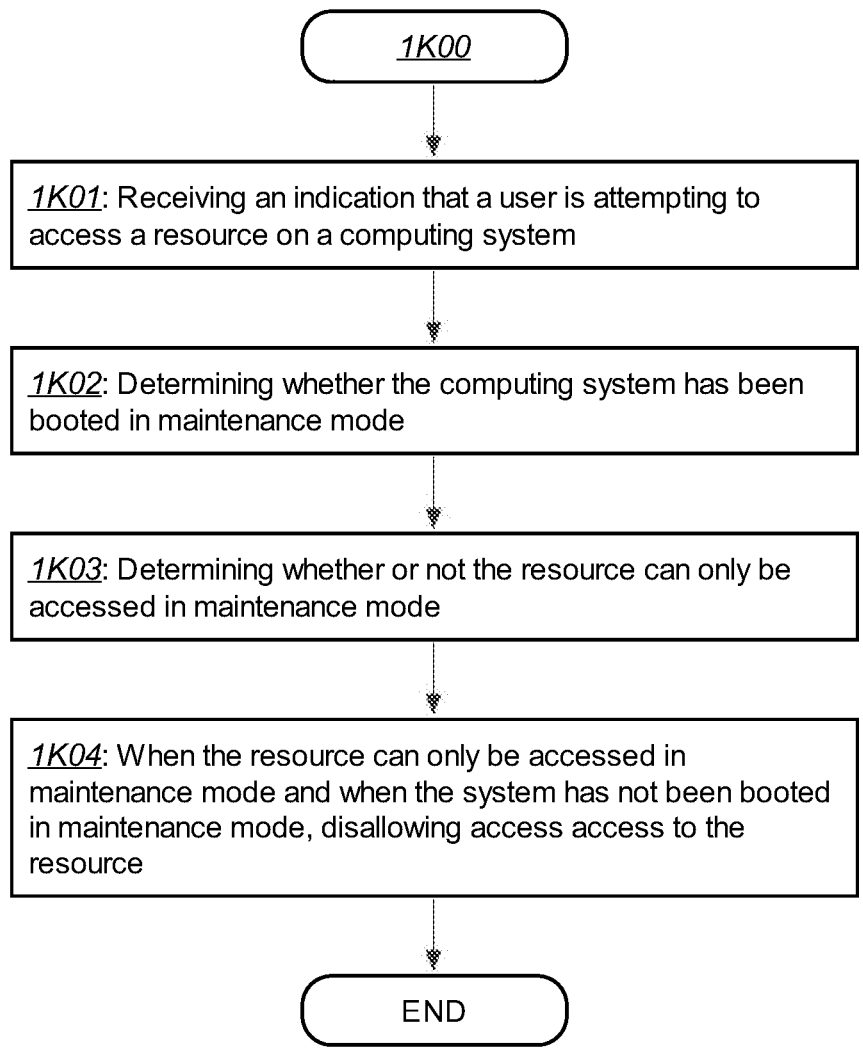

FIG. 1K is a flow diagram of example logic for computer security. FIG. 1K illustrates a process 1K00 that includes the following block(s).

Block 1K01 includes receiving an indication that a user is attempting to access a resource on a computing system. For example, the process may receive an indication that a user (or a program associated with the user) is attempting to read, write, or execute a file, directory, or program on the computing system.

Block 1K02 includes determining whether the computing system has been booted in maintenance mode. For example, the process may determine whether the computer has been booted into safe or maintenance mode, such as by reading a flag or file or other identifier that was set during system boot. As described further above, maintenance mode is in some systems a diagnostic or administrative mode in which only core operating system services are started in order to diagnose and fix problems, or modify the operating system components, configuration, or functionality.

Block 1K03 includes determining whether or not the resource can only be accessed in maintenance mode. In some embodiments, every resource has an associated permission bit that indicates whether or not the resource is accessible only in safe mode. This bit can be combined with other permission identifiers, such as user or group identifiers to restrict access to particular users.

Block 1K04 includes when the resource can only be accessed in maintenance mode and when the system has not been booted in maintenance mode, disallowing access access to the resource. Disallowing access may include disallowing execution of the resource, as described above. Disallowing access may also or instead include refusing to open, read, or write the resource.

FIG. 1L is a flow diagram of example logic illustrating an extension of process 1K00 of FIG. 1K. FIG. 1L illustrates a process 1L00 that includes the process 1K00, and which further includes the following block(s).

Block 1L01 includes determining a source identifier associated with the user. For example, the process may receive an IP address that is associated with a remote access of the resource. Alternatively, the source identifier may be a hardware identifier such as a MAC address.

Block 1L02 includes determining whether or not an access control list associated with the resource specifies the source identifier as allowable. In some embodiments, every resource has an access control list that additionally specifies one or more identifiers or local or remote sources that are allowed to access the resource. The identifiers may by network addresses or ranges, hardware identifiers, or the like.

Block 1L03 includes controlling access based on whether or not (1) the source identifier is specified as allowable, (2) the resource can only be accessed in maintenance mode, and (3) the system has been booted in maintenance mode. Controlling access includes allowing or disallowing access to the resource. In some embodiments, some resources are locked down in the sense that they can only be accessed in maintenance mode and when the source identifier is specified as an allowable source.

Figure 2:
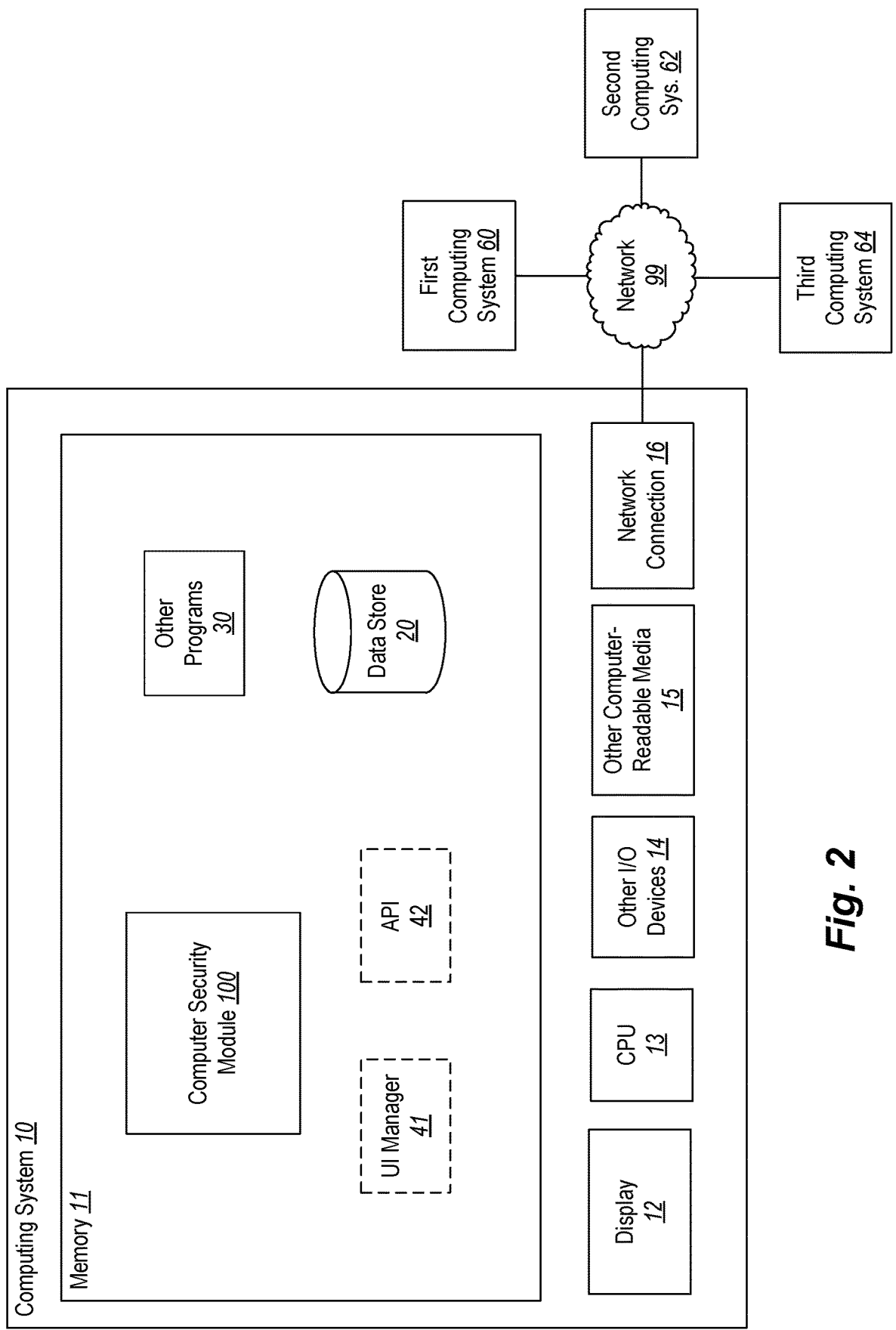
FIG. 2 is a block diagram of an example computing system or device for implementing a computer security module according to an example embodiment.

FIG. 2 is a block diagram of an example computing system or device for implementing a computer security module according to an example embodiment. In particular, FIG. 2 shows a computing system 10 that executes a module 100 that implements at least some of the techniques described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and a network connection 16. The module 100 is shown residing in memory 11. In other embodiments, some portion of the contents, some or all of the components of the module 100 may be stored on and/or transmitted over the other computer-readable media 15. The module 100 preferably executes on one or more CPUs 13 and performs the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 7 may not be present in any specific implementation. For example, some embodiments may not provide other computer readable media 15 or a display 12.

The module 100 is shown executing in the memory 11 of the device 100. Also included in the memory 11 are a user interface manager 41 and an application program interface ("API") 42. The user interface manager 41 and the API 42 are drawn in dashed lines to indicate that in other embodiments, functions performed by one or more of these components may be performed externally to the module 100.

The UI manager 41 provides a view and a controller that facilitate user interaction with the module 100 and its various components. For example, the UI manager 41 may provide interactive access to the module 100, such that users or administrators can interact with the module 100. In some embodiments, access to the functionality of the UI manager 41 may be provided via a Web server, possibly executing as one of the other programs 30. In such embodiments, a user operating a Web browser executing on the user computing system 60 can interact with the module 100 via the UI manager 41.

The API 42 provides programmatic access to one or more functions of the module 100. For example, the API 42 may provide a programmatic interface to one or more functions of the module 100 that may be invoked by one of the other programs 30 or some other module. In this manner, the API 42 facilitates the development of third-party software, such as user interfaces, plug-ins, adapters (e.g., for integrating functions of the module 100 into Web applications), and the like.

The module 100 may interact using network connection 16 via a network 99 with other devices/systems including computing systems 60, 62, and 64. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices.

Note that one or more general purpose or special purpose computing systems/devices may be used to implement and/or execute the module 100. However, just because it is possible to implement the module 100 on a general purpose computing system does not mean that the techniques themselves or the operations (taken alone or in combination) required to implement the techniques are conventional or well known. The techniques are not conventional at least because they address and improve an existing technology, such as by improving the operation, integration, or efficiency of one or more computing systems.

In an example embodiment, components/modules of the module 100 are implemented using software programming techniques. For example, the module 100 may be implemented as a "native" executable running on the CPU 13, along with one or more static or dynamic libraries. In other embodiments, the module 100 may be implemented as instructions processed by a virtual machine that executes as one of the other programs 30.

The various components may be implemented using more monolithic programming techniques, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the module 100, such as in the data store 20, can be available by language-specific APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Furthermore, in some embodiments, some or all of the components of the module 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While embodiments of the invention have been illustrated and described, as noted above, many changes can be made without departing from the spirit and scope of the invention. Accordingly, the scope of the invention is not limited by the above disclosure.

The invention claimed is:

1. A method for computer security, the method comprising:
 receiving an indication that a user is attempting to access a resource on a computing system, wherein the resource is a file or directory stored on the computing system;
 determining a source identifier associated with the user;
 determining whether or not an access control list associated with the resource specifies the source identifier as allowable;
 determining whether the computing system is executing maintenance mode;
 determining, based on a permission bit associated with the resource by the access control list, whether or not the resource can only be accessed by a superuser who has logged into the computing system in maintenance mode, wherein the computing system allows only specified superusers to log in when the computing system is in maintenance mode, and wherein the computing system requires the specified superusers to log in from a local console and not via a network;
 controlling access based on whether or not (1) the source identifier is specified as allowable, (2) the resource can only be accessed by a superuser who has logged into the computing system in maintenance mode, and (3) the system is executing in maintenance mode; and
 disallowing access to the resource when the source identifier is specified as not allowable.

2. The method of claim 1, wherein the receiving an indication that a user is attempting to access a resource on a computing system includes: receiving a user identifier associated with a process identifier that is associated with a program executing on the computing system.

3. The method of claim 1, wherein the receiving an indication that a user is attempting to access a resource on a computing system includes: receiving an indication that a program executed by the user is attempting to read, write, or execute a file.

4. The method of claim 1, wherein the determining a source identifier associated with the user includes: receiving a network address of a computing system operated by the user.

5. The method of claim 1, wherein the determining a source identifier associated with the user includes: receiving a hardware identifier of a computing system operated by the user.

6. The method of claim 1, wherein the disallowing access to the resource includes: terminating the program, suspending the program, and/or raising an exception.

7. A method for computer security, the method comprising:
 receiving an indication that a user is attempting to access a resource on a computing system, wherein the resource is a file or directory stored on the computing system;
 determining whether the computing system has been booted in maintenance mode;
 determining, based on a permission bit associated with the resource by an access control list associated with the resource, whether or not the resource can only be accessed by a superuser who has logged into the computing system in maintenance mode, wherein the computing system allows only specified superusers to log in when the computing system is in maintenance mode, and wherein the computing system requires the specified superusers to log in from a local console and not via a network; and when the resource can only be accessed in maintenance mode and when the system has not been booted in maintenance mode, disallowing access to the resource.

8. The method of claim 7, wherein the receiving an indication that a user is attempting to access a resource on a computing system includes: receiving a user identifier associated with a process identifier that is associated with a program executing on the computing system.

9. The method of claim 7, wherein the determining whether the computing system has been booted in maintenance mode includes: determining whether an operating system executing on the computing system is operating in single-user diagnostic mode.

10. The method of claim 7, wherein the determining whether the computing system has been booted in maintenance mode includes: determining whether an operating system executing on the computing system is operating in a mode that allows only administrative users to log in.

11. The method of claim 7, wherein the determining whether the computing system has been booted in maintenance mode includes: determining whether an operating system executing on the computing system is operating in a mode that allows log in only from a local console.

12. The method of claim 7, further comprising:
determining a source identifier associated with the user;
determining whether or not an access control list associated with the resource specifies the source identifier as allowable; and
controlling access based on whether or not (1) the source identifier is specified as allowable, (2) the resource can only be accessed in maintenance mode, and (3) the system has been booted in maintenance mode.

13. The method of claim 12, wherein the determining whether the computing system has been booted in maintenance mode includes:
receiving a token generated during an authentication process between the user and the computing system; and
determining the source identifier based on the token.

14. A computing system for computer security, the system comprising:
a processor; and
a module configured, when executed by the processor, to:
receive an indication that a user is attempting to access a resource on the computing system, wherein the resource is a file or directory stored on the computing system;
determine a source identifier associated with the user;
determine whether or not an access control list associated with the resource specifies the source identifier as allowable;
determine whether the computing system is executing maintenance mode;
determine, based on a permission bit associated with the resource by the access control list, whether or not the resource can only be accessed by a superuser who has logged into the computing system in maintenance mode, wherein the computing system allows only specified superusers to log in when the computing system is in maintenance mode, and wherein the computing system requires the specified superusers to log in from a local console and not via a network; and
control access based on whether or not (1) the source identifier is specified as allowable, (2) the resource can only be accessed by a superuser who has logged into the computing system in maintenance mode, and (3) the system is executing in maintenance mode.

15. The system of claim 14, further comprising: a secure boot module that checks a digital signature of every code module executed during system startup.

16. The system of claim 14, wherein the access control list associated with the resource (1) includes a permission bit that indicates whether or not the resource is accessible only in safe mode and (2) specifies source IP addresses that are allowed to access the resource.

17. The method of claim 7, further comprising:
receiving a list of privileged directories;
disallowing execution of a program that is not located in one of the privileged directories.

18. The method of claim 7, further comprising:
receiving one or more IP addresses that are allowed to execute a program;
determining an IP address associated with the user that is attempting to access the resource on the computing system;
disallowing execution of a program when the IP address is not one of the one or more IP addresses that are allowed to execute the program.

19. The method of claim 7, wherein the access control list associated with the resource (1) includes a permission bit that indicates whether or not the resource is accessible only in safe mode and (2) specifies source IP addresses that are allowed to access the resource.

* * * * *